(12) United States Patent
Girt

(10) Patent No.: US 6,815,082 B2
(45) Date of Patent: Nov. 9, 2004

(54) ANTI-FERROMAGNETICALLY COUPLED PERPENDICULAR MAGNETIC RECORDING MEDIA

(75) Inventor: Erol Girt, Berkeley, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 10/179,876

(22) Filed: Jun. 26, 2002

(65) Prior Publication Data

US 2003/0104247 A1 Jun. 5, 2003

Related U.S. Application Data

(60) Provisional application No. 60/337,287, filed on Nov. 30, 2001.

(51) Int. Cl.$^7$ ............................................. G11B 5/673
(52) U.S. Cl. ....................... 428/611; 428/637; 428/670; 428/678; 428/686; 428/215; 428/332; 428/694 TS; 428/694 TM; 427/128; 427/131
(58) Field of Search ................................. 428/670, 611, 428/636, 637, 668, 669, 678, 686, 215, 332, 336, 694 TS, 694 TM; 427/128, 131

(56) References Cited

U.S. PATENT DOCUMENTS

| | | | |
|---|---|---|---|
| 5,408,377 A | 4/1995 | Gurney et al. | |
| 5,598,308 A | 1/1997 | Dieny et al. | |
| 5,792,564 A | 8/1998 | Hikosaka et al. | |
| 5,815,342 A | 9/1998 | Akiyama et al. | |
| 5,851,643 A | 12/1998 | Honda et al. | |
| 6,031,692 A | 2/2000 | Kawawake et al. | |
| 6,280,813 B1 | 8/2001 | Carey et al. | |
| 6,372,330 B1 * | 4/2002 | Do et al. | 428/212 |
| 6,537,684 B1 * | 3/2003 | Doerner et al. | 428/611 |
| 2002/0045070 A1 * | 4/2002 | Sakakima et al. | 428/694 TS |
| 2002/0076579 A1 * | 6/2002 | Hanawa et al. | 428/694 TS |
| 2002/0098390 A1 * | 7/2002 | Do et al. | 428/694 TS |
| 2002/0132140 A1 * | 9/2002 | Igarashi et al. | 428/694 TM |
| 2003/0022023 A1 * | 1/2003 | Carey et al. | 428/694 MM |
| 2003/0090831 A1 * | 5/2003 | Doerner et al. | 360/97.01 |

FOREIGN PATENT DOCUMENTS

| | | |
|---|---|---|
| EP | 0687917 A2 | 12/1995 |
| EP | 0994465 A1 | 4/2000 |
| WO | WO 97/34295 | 9/1997 |

OTHER PUBLICATIONS

Abarra, E., Acharya, B., Inomata, A., and Okamoto, I. (IEEE Trans. Mag., 37(4), 2001, 1426–1431).*

* cited by examiner

*Primary Examiner*—Kevin M. Bernatz
(74) *Attorney, Agent, or Firm*—McDermott Will & Emery LLP

(57) ABSTRACT

A high areal recording density, anti-ferromagnetically coupled ("AFC") perpendicular magnetic recording medium comprises:
  a layer stack formed over the surface of a non-magnetic substrate (2), comprising, in overlying sequence:
    an underlayer (3) comprised of a magnetically soft ferromagnetic material;
    at least one non-magnetic interlayer (4);
    a perpendicularly anisotropic stabilization layer (6) comprised of a hard ferromagnetic material;
    a non-magnetic spacer layer (7); and
    a perpendicularly anisotropic main recording layer (5) comprised of a hard ferromagnetic material;
  wherein the perpendicularly anisotropic stabilization layer (6) and the perpendicularly anisotropic main recording layer (5) are anti-ferromagnetically coupled (AFC) across the non-magnetic spacer layer (7) to orient the magnetic moments thereof anti-parallel and thereby provide the medium with increased

20 Claims, 4 Drawing Sheets

US 6,815,082 B2

ANTI-FERROMAGNETICALLY COUPLED PERPENDICULAR MAGNETIC RECORDING MEDIA

CROSS-REFERENCE TO PROVISIONAL APPLICATION

This application claims priority from U.S. provisional patent application Ser. No. 60/337,287 filed Nov. 30, 2001, the entire disclosure of which is incorporated herein by reference.

FIELD OF THE INVENTION

The present invention relates to perpendicular magnetic recording media with improved signal-to-medium noise ratio ("SMNR") and thermal stability, which media include a pair of vertically spaced-apart perpendicular ferromagnetic layers which are anti-ferromagnetically coupled ("AFC") across a non-magnetic spacer layer, and a method of manufacturing same. The invention is of particular utility in the fabrication of data/information storage and retrieval media, e.g., hard disks, having ultra-high areal recording/storage densities.

BACKGROUND OF THE INVENTION

Magnetic media are widely used in various applications, particularly in the computer industry, and efforts are continually made with the aim of increasing the areal recording density, i.e., bit density of the magnetic media. In this regard, so-called "perpendicular" recording media have been found to be superior to the more conventional "longitudinal" media in achieving very high bit densities. In perpendicular magnetic recording media, residual magnetization is formed in a direction perpendicular to the surface of the magnetic medium, typically a layer of a magnetic material on a suitable substrate. Very high linear recording densities are obtainable by utilizing a "single-pole" magnetic transducer or "head" with such perpendicular magnetic media.

It is well-known that efficient, high bit density recording utilizing a perpendicular magnetic medium requires interposition of a relatively thick (i.e., as compared to the magnetic recording layer), magnetically "soft" underlayer, i.e., a magnetic layer having a relatively low coercivity of about 1 kOe or below, such as of a NiFe alloy (Permalloy), between the non-magnetic substrate, e.g., of glass, aluminum (Al) or an Al-based alloy, and the "hard" magnetic recording layer having relatively high coercivity of several kOe, typically about 3—6 kOe, e.g., of a cobalt-based alloy (e.g., a Co—Cr alloy) having perpendicular anisotropy. The magnetically soft underlayer serves to guide magnetic flux emanating from the head through the hard, perpendicular magnetic recording layer. In addition, the magnetically soft underlayer reduces susceptibility of the medium to thermally-activated magnetization reversal by reducing the demagnetizing fields which lower the energy barrier that maintains the current state of magnetization.

A typical perpendicular recording system 10 utilizing a vertically oriented magnetic medium 1 with a relatively thick soft magnetic underlayer, a relatively thin hard magnetic recording layer, and a single-pole head, is illustrated in FIG. 1, wherein reference numerals 2, 3, 4, and 5, respectively, indicate the substrate, soft magnetic underlayer, at least one non-magnetic interlayer, and vertically oriented, hard magnetic recording layer of perpendicular magnetic medium 1, and reference numerals 7 and 8, respectively, indicate the single and auxiliary poles of single-pole magnetic transducer head 6. Relatively thin interlayer 4 (also referred to as an "intermediate" layer), comprised of one or more layers of non-magnetic materials, serves to (1) prevent magnetic interaction between the soft underlayer 3 and the hard recording layer 5 and (2) promote desired microstructural and magnetic properties of the hard recording layer. As shown by the arrows in the figure indicating the path of the magnetic flux $\phi$, flux $\phi$ is seen as emanating from single pole 7 of single-pole magnetic transducer head 6, entering and passing through vertically oriented, hard magnetic recording layer 5 in the region above single pole 7, entering and travelling along soft magnetic underlayer 3 for a distance, and then exiting therefrom and passing through vertically oriented, hard magnetic recording layer 5 in the region above auxiliary pole 8 of single-pole magnetic transducer head 6. The direction of movement of perpendicular magnetic medium 1 past transducer head 6 is indicated in the figure by the arrow above medium 1.

With continued reference to FIG. 1, vertical lines 9 indicate grain boundaries of each polycrystalline (i.e., granular) layer of the layer stack constituting medium 1. As apparent from the figure, the width of the grains (as measured in a horizontal direction) of each of the polycrystalline layers constituting the layer stack of the medium is substantially the same, i.e., each overlying layer replicates the grain width of the underlying layer. Not shown in the figure, for illustrative simplicity, are a protective overcoat layer, such as of a diamond-like carbon (DLC) formed over hard magnetic layer 5, and a lubricant topcoat layer, such as of a perfluoropolyethylene material, formed over the protective overcoat layer. Substrate 2 is typically disk-shaped and comprised of a non-magnetic metal or alloy, e.g., Al or an Al-based alloy, such as Al—Mg having an Ni—P plating layer on the deposition surface thereof, or substrate 2 is comprised of a suitable glass, ceramic, glass-ceramic, polymeric material, or a composite or laminate of these materials; underlayer 3 is typically comprised of an about 500 to about 4,000 Å thick layer of a soft magnetic material selected from the group consisting of Ni, NiFe (Permalloy), Co, CoZr, CoZrCr, CoZrNb, CoFe, Fe, FeN, FeSiAl, FeSiAlN, FeCoC, etc.; interlayer 4 typically comprises an up to about 300 Å thick layer of a non-magnetic material, such as TiCr; and hard magnetic layer 5 is typically comprised of an about 100 to about 250 Å thick layer of a Co-based alloy including one or more elements selected from the group consisting of Cr, Fe, Ta, Ni, Mo, Pt, V, Nb, Ge, B, and Pd, iron oxides, or a $(CoX/Pd$ or $Pt)_n$ multilayer magnetic superlattice structure, where n is an integer from about 10 to about 25, each of the alternating, thin layers of Co-based magnetic alloy is from about 2 to about 3.5 Å thick, X is an element selected from the group consisting of Cr, Ta, B, Mo, Pt, W, and Fe, and each of the alternating thin, non-magnetic layers of Pd or Pt is about 1 Å thick. Each type of hard magnetic recording layer material has perpendicular anisotropy arising from magneto-crystalline anisotropy ($1^{st}$ type) and/or interfacial anisotropy ($2^{nd}$ type).

In general, an improvement in the signal-to-medium noise ratio (SMNR) of perpendicular magnetic recording media such as described above can be obtained by decreasing the average volume V of the magnetic grains and/or by decreasing interactions between the grains. However, in either instance, thermal stability of the perpendicular media is compromised.

In view of the above, there exists a clear need for improved, high areal recording density, perpendicular magnetic information/data recording, storage, and retrieval media which exhibit both increased signal-to-media noise ratios (SMNR) and thermal stability. In addition, there exists a need for an improved method for manufacturing high areal recording density, perpendicular magnetic recording media which exhibit both increased SMNR and thermal stability, which media can be readily and economically fabricated by means of conventional manufacturing techniques and instrumentalities.

The present invention addresses and solves problems attendant upon the design and manufacture of high bit density perpendicular magnetic media, e.g., obtainment of high SMNR without compromising the thermal stability of the media, while maintaining all structural and mechanical aspects of high bit density recording technology. Moreover, the magnetic media of the present invention advantageously can be fabricated by means of conventional manufacturing techniques, e.g., sputtering.

DISCLOSURE OF THE INVENTION

An advantage of the present invention is an improved, high areal recording density, perpendicular magnetic recording medium.

Another advantage of the present invention is an improved, high areal recording density, anti-ferromagnetically coupled (AFC), perpendicular magnetic recording medium having increased signal-to-noise ratio (SMNR) and thermal stability.

Still another advantage of the present invention is a method of manufacturing an improved, high areal recording density, perpendicular magnetic recording medium.

Yet another advantage of the present invention is a method of manufacturing an improved, high areal recording density, anti-ferromagnetically coupled (AFC), perpendicular magnetic recording medium having an increased signal-to-noise ratio (SMNR) and thermal stability.

Additional advantages and other features of the present invention will be set forth in the description which follows and in part will become apparent to those having ordinary skill in the art upon examination of the following or may be learned from the practice of the present invention. The advantages of the present invention may be realized as particularly pointed out in the appended claims.

According to one aspect of the present invention, the foregoing and other advantages are obtained in part by a high areal recording density, anti-ferromagnetically coupled ("AFC") perpendicular magnetic recording medium, comprising:

(a) a non-magnetic substrate having a surface; and (b) a layer stack formed over the substrate surface, the layer stack comprising, in overlying sequence from the substrate surface:

($b_1$) an underlayer comprised of a magnetically soft ferromagnetic material or a plurality of layers of magnetically soft ferromagnetic material separated by thin, non-magnetic spacer layers;

($b_2$) at least one non-magnetic interlayer;

($b_3$) a perpendicularly anisotropic stabilization layer comprised of a hard ferromagnetic material;

($b_4$) a non-magnetic spacer layer; and ($b_5$) a perpendicularly anisotropic main recording layer comprised of a hard ferromagnetic material;

wherein the perpendicularly anisotropic stabilization layer ($b_3$) and the perpendicularly anisotropic main recording layer ($b_5$) are anti-ferromagnetically coupled (AFC) across the non-magnetic spacer layer ($b_4$) to orient the magnetic moments thereof anti-parallel and thereby provide the medium with increased SMNR and thermal stability.

According to embodiments of the present invention, the non-magnetic spacer layer ($b_4$) is from about 2 to about 15 Å thick, e.g., from about 4 to about 11 Å thick and selected to maximize anti-ferromagnetic coupling between stabilization layer ($b_3$) and main recording layer ($b_5$), comprising a material selected from the group consisting of Ru, Rh, Ir, Cr, Cu, Re, V, and their alloys; and the layer stack (b) optionally further comprises:

($b_6$) at least one ferromagnetic interface layer at at least one interface between the non-magnetic spacer layer ($b_4$) and the main recording layer ($b_5$) and/or the stabilization layer ($b_3$), wherein:

the at least one ferromagnetic interface layer ($b_6$) is present at the interface between the non-magnetic spacer layer ($b_4$) and the main recording layer ($b_5$), or the at least one ferromagnetic interface layer ($b_6$) is present at the interface between the non-magnetic spacer layer ($b_4$) and the stabilization layer ($b_3$), or the at least one ferromagnetic interface layer ($b_6$) is present at the interfaces between the non-magnetic spacer layer ($b_4$) and each of the main recording layer ($b_5$) and stabilization layer ($b_3$).

In accordance with embodiments of the present invention, the at least one ferromagnetic interface layer ($b_6$) comprises an about 1 monolayer to an about 40 Å thick layer of a ferromagnetic material having a saturation magnetization value $M_s$ >300 emu/cc, and according to particular embodiments of the present invention, the at least one ferromagnetic interface layer ($b_6$) comprises a layer of a high moment element or alloy selected from Fe, Co, FeCo, and their alloys containing at least one element selected from Cr, Pt, Ta, B, Mo, Ru, Si, Ge, Nb, Ni, Cu, Ag, Au, and W, wherein the concentration of Co, Fe, or CoFe in the alloy is constant or varies across the thickness of the at least one interface layer ($b_6$) from higher near an interface with the non-magnetic spacer layer ($b_4$) to lower near an interface with the stabilization layer ($b_3$) or the main recording layer ($b_5$).

According to certain embodiments of the present invention, the layer stack (b) further includes at least one additional stacked pair of layers between the main recording layer ($b_5$) and the non-magnetic spacer layer ($b_4$), consisting of a magnetic layer with perpendicular magnetic anisotropy and a non-magnetic spacer layer, such that layer stack (b) comprises alternating magnetic layers and non-magnetic spacer layers, and the magnetic energies of the magnetic layers and coupling energies between magnetic layers are selected to provide anti-parallel alignment of magnetic moments of adjacent magnetic layers during data storage in the medium.

In accordance with particular embodiments of the present invention, the stabilization layer ($b_3$) and main recording layer ($b_5$) each comprise an about 3 to about 300 Å thick layer of a ferromagnetic alloy selected from CoCr and CoCr containing at least one element selected from Pt, Ta, B, Mo, Ru, Si, Ge, Nb, Fe, Ni, and W, or the stabilization layer ($b_3$) and the main recording layer ($b_5$) each comprise an about 10 to about 300 Å thick layer of a (CoX/Pd or Pt)$_n$, (FeX/Pd or Pt)$_n$, or (FeCoX/Pd or Pt)$_n$ multilayer magnetic superlattice structure, where n is an integer from about 1 to about 25, each of the alternating layers of Co-based, Fe-based, or CoFe-based magnetic alloy is from about 1.5 to about 10 Å thick, X is one or more elements selected from the group consisting of Pt, Ta, B, Mo, Ru, Si, Ge, Nb, Ni, Cr, and W, and each of the alternating layers of non-magnetic Pd or Pt is from about 3 to about 15 Å thick.

According to embodiments of the present invention, the non-magnetic substrate (a) comprises a material selected from the group consisting of: Al, NiP-plated Al, Al—Mg alloys, other Al-based alloys, other non-magnetic metals, other non-magnetic alloys, glass, ceramics, polymers, glass-ceramics, and composites and/or laminates thereof;

underlayer ($b_1$) comprises an about 500 to about 4,000 Å thick layer comprised of at least one soft ferromagnetic material selected from Ni, NiFe (Permalloy), Co, CoZr, CoZrCr, CoZrNb, CoTaZr, CoFe, Fe, FeN, FeSiAl, FeSiAlN, FeTaC, FeAlN, FeTaN, CoFeZr, FeCoB, and FeCoC; and the at least one interlayer ($b_2$) comprises an about 10 to about 300 Å thick layer or layers of at least one non-magnetic material selected from Pt, Pd, Ir, Re, Ru, Hf, and alloys thereof, or a hexagonal Co-based non-magnetic alloy with at least one of Cr, Pt, Ta, and B; and the medium further comprises:

(c) a protective overcoat layer on the main recording layer ($b_5$); and (d) a lubricant topcoat layer over the protective overcoat layer (c).

Another aspect of the present invention is a method of manufacturing a high areal recording density, anti-ferromagnetically coupled ("AFC") perpendicular magnetic recording medium, comprising the steps of:

(a) providing a non-magnetic substrate having a surface; and (b) forming a layer stack over the substrate surface, comprising the following sequential steps for forming an overlying sequence of layers from the substrate surface:

($b_1$) forming an underlayer comprised of a magnetically soft ferromagnetic material or a plurality of layers of magnetically soft material separated by thin, non-magnetic spacer layers;

($b_2$) forming at least one non-magnetic interlayer;

($b_3$) forming a perpendicularly anisotropic stabilization layer comprised of a hard ferromagnetic material;

($b_4$) forming a non-magnetic spacer layer; and ($b_5$) forming a perpendicularly anisotropic main recording layer comprised of a hard ferromagnetic material;

wherein the perpendicularly anisotropic stabilization layer and the perpendicularly anisotropic main recording layer are anti-ferromagnetically coupled (AFC) across the non-magnetic spacer layer to orient the magnetic moments thereof anti-parallel and thereby provide the medium with increased SMNR and thermal stability.

According to embodiments of the present invention, step ($b_4$) comprises forming an about 2 to about 15 Å thick layer, e.g., from about 4 to about 11 Å thick, of a non-magnetic material selected to maximize anti-ferromagnetic coupling between stabilization layer ($b_3$) and main recording layer ($b_5$), comprising a material selected from the group consisting of Ru, Rh, Ir, Cr, Cu, Re, V, and their alloys; and the method optionally further comprises the step of:

($b_6$) forming at least one ferromagnetic interface layer at at least one interface between the non-magnetic spacer layer and the main recording layer and/or the stabilization layer, wherein step ($b_6$) comprises one of the following alternatives:

(i) forming the at least one ferromagnetic interface layer at the interface between the non-magnetic spacer layer and the main recording layer;

(ii) forming the at least one ferromagnetic interface layer at the interface between the non-magnetic spacer layer and the stabilization layer; and (iii) forming the at least one ferromagnetic interface layer at the interfaces between the non-magnetic spacer layer and each of the main recording layer and stabilization layer.

In accordance with particular embodiments of the present invention, step ($b_6$) comprises forming an about 1 monolayer to an about 40 Å thick layer of a ferromagnetic material having a saturation magnetization value $M_s$>300 emu/cc, comprising a high moment element or alloy selected from Fe, Co, FeCo, and their alloys containing at least one element selected from Cr, Pt, Ta, B, Mo, Ru, Si, Ge, Nb, Ni, Cu, Ag, Au, and W, wherein the concentration of Co, Fe, or CoFe in the alloy is constant or varies across the thickness of the at least one interface layer from higher near an interface with the non-magnetic spacer layer to lower near an interface with the stabilization layer or the main recording layer.

According to additional embodiments of the present invention, step (b) further comprises the sequential steps of:

($b_6$) forming a non-magnetic spacer layer in overlying contact with the main recording layer formed in step ($b_5$); and ($b_7$) forming a perpendicularly anisotropic main recording layer in overlying contact with the non-magnetic spacer layer formed in step ($b_6$);

wherein the above sequence of performing step ($b_6$) followed by step ($b_7$) is performed one or more times and step (b) comprises a still further step ($b_8$) of forming at least one ferromagnetic interface layer at at least one interface between the non-magnetic spacer layers and the main recording layers and stabilization layer.

In accordance with particular embodiments of the present invention, steps ($b_3$) and ($b_5$) for forming the stabilization and main recording layers each comprise forming a perpendicularly anisotropic, hard ferromagnetic layer selected from the following alternatives:

(i) an about 3 to about 300 Å thick layer of a ferromagnetic alloy selected from CoCr and CoCr containing at least one element selected from Pt, Ta, B, Mo, Ru, Si, Ge, Nb, Fe, Ni, and W; and (ii) an about 10 to about 300 Å thick layer of a (CoX/Pd or Pt)$_n$, (FeX/Pd or Pt)$_n$, or (FeCoX/Pd or Pt)$_n$ multi-layer magnetic superlattice structure, where n is an integer from about 1 to about 25, each of the alternating layers of Co-based, Fe-based, or CoFe-based magnetic alloy is from about 1.5 to about 10 Å thick, X is one or more elements selected from the group consisting of Pt, Ta, B, Mo, Ru, Si, Ge, Nb, Ni, Cr, and W, and each of the alternating layers of non-magnetic Pd or Pt is from about 3 to about 15 Å thick.

According to embodiments of the present invention, step (a) comprises providing a non-magnetic substrate comprising a material selected from the group consisting of: Al, NiP-plated Al, Al—Mg alloys, other Al-based alloys, other nonmagnetic metals, other non-magnetic alloys, glass, ceramics, polymers, glass-ceramics, and composites and/or laminates thereof;

step ($b_1$) comprises forming an underlayer comprising an about 500 to about 4,000 Å thick layer comprised of at least one soft ferromagnetic material selected from Ni, NiFe (Permalloy), Co, CoZr, CoZrCr, CoZrNb, CoTaZr, CoFe, Fe, FeN, FeSiAl, FeSiAlN, FeTaC, FeAlN, FeTaN, CoFeZr, FeCoB, and FeCoC;

step ($b_2$) comprises forming at least one interlayer comprising an about 10 to about 300 Å thick layer or layers of at least one non-magnetic material selected from Pt, Pd, Ir, Re, Ru, Hf, and alloys thereof, or a hexagonal Co-based nonmagnetic alloy with at least one of Cr, Pt, Ta, and B; and the method comprises the further steps of:

(c) forming a protective overcoat layer on the main recording layer; and (d) forming a lubricant topcoat layer over the protective overcoat layer.

Still another aspect of the present invention is a high areal recording density, anti-ferromagnetically coupled ("AFC") perpendicular magnetic recording medium, comprising:

(a) a pair of vertically spaced-apart, perpendicularly magnetically anisotropic layers each comprised of a hard ferromagnetic material; and (b) means for anti-ferromagnetically coupling the pair of vertically spaced-apart layers to orient the magnetic moments thereof anti-parallel and thereby provide the medium with increased SMNR and thermal stability.

Additional advantages and aspects of the present invention will become readily apparent to those skilled in the art from the following detailed description, wherein embodiments of the present invention are shown and described, simply by way of illustration of the best mode contemplated for practicing the present invention. As will be described, the present invention is capable of other and different embodiments, and its several details are susceptible of modification in various obvious respects, all without departing from the spirit of the present invention. Accordingly, the drawings and description are to be regarded as illustrative in nature, and not limitative.

BRIEF DESCRIPTION OF THE DRAWINGS

The following detailed description of the embodiments of the present invention can best be understood when read in conjunction with the following drawings, in which the various features are not necessarily drawn to scale but rather are drawn as to best illustrate the pertinent features, and in which like reference numerals are employed throughout to designate similar features, wherein.

DESCRIPTION OF THE INVENTION

The present invention is based upon the recognition that very high areal recording density perpendicular magnetic recording media, having improved thermal stability and SMNR, can be reliably and controllably manufactured by providing a multi-layered structure comprising at least one pair of vertically spaced-apart, magnetically hard, perpendicular ferromagnetic layers, i.e., a lower, stabilization layer (i.e., further from the recording head) and an upper, main recording layer (i.e., closer to the recording head), which spaced-apart layers are anti-ferromagnetically coupled together by interposition of a magnetic coupling structure therebetween, whereby the magnetic moments of the pair of perpendicular ferromagnetic layers are oriented anti-parallel. According to the invention, the magnetic coupling structure is comprised of a thin non-magnetic spacer layer, or a combination of a thin non-magnetic spacer layer and a thin ferromagnetic interface layer that may be present at at least one interface between the pair of perpendicular ferromagnetic layers and the non-magnetic spacer layer, wherein provision of the at least one thin ferromagnetic interface layer provides enhanced RKKY-type magnetic coupling between the perpendicular ferromagnetic layers, hence increased thermal stability.

The inventive methodology affords several advantages not obtainable according to the conventional art, including, inter alia, increased anti-parallel oriented, RKKY-type magnetic coupling (AFC) between vertically spaced-apart pairs of magnetically hard, perpendicular ferromagnetic layers composed of alloy compositions typically employed in the fabrication of perpendicular recording media, hence improved thermal stability and SMNR; and reliable, controllable, and cost-effective formation of very high areal recording density, thermally stable perpendicular magnetic recording media utilizing conventional manufacturing techniques and instrumentalities, e.g., sputtering techniques and apparatus.

According to the invention, the thin non-magnetic thin spacer layer may be comprised of a non-magnetic material, e.g., Ru, Rh, Ir, Cr, Cu, Re, V, and their alloys, and the at least one interface layer comprises a ferromagnetic material having a saturation magnetization value $M_s$>300 emu/cc, selected from Fe, Co, FeCo, and their alloys containing at least one element selected from Cr, Pt, Ta, B, Mo, Ru, Si, Ge, Nb, Ni, Cu, Ag, and W, wherein the concentration of Co, Fe, or CoFe in the alloy is constant or varies across the thickness of the at least one interface layer from higher near an interface with the non-magnetic spacer layer to lower near an interface with the stabilization layer or the main recording layer.

Figure 2:
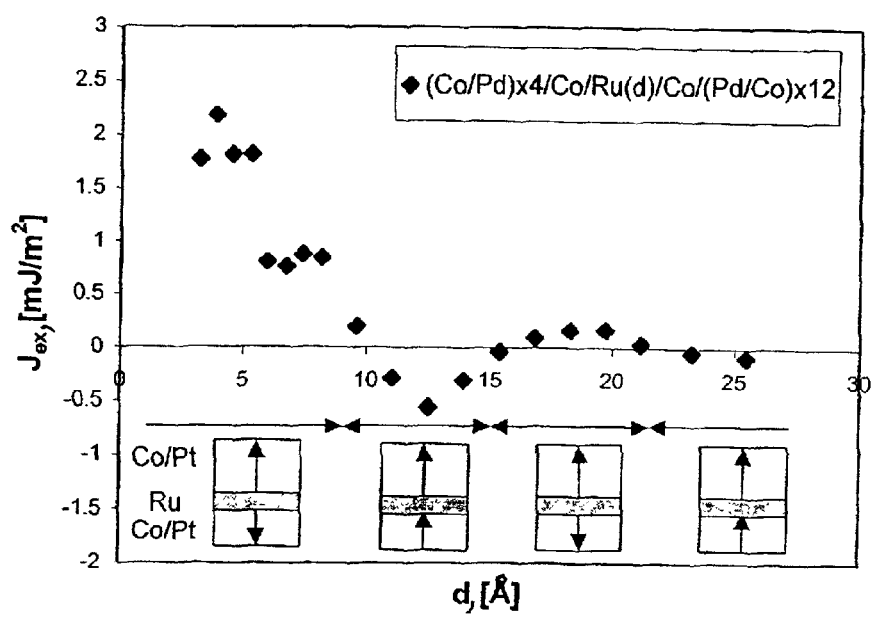
FIG. 2 is a graph for showing the variation of the interface exchange energy density J as a function of Ru spacer layer thickness of an anti-ferromagnetically coupled (AFC), superlattice-based perpendicular magnetic recording media according to the present invention, having a layer structure of [Co(2.5 Å)/Pt(9 Å)]$_4$/Co(10 Å)/Ru(variable Å)/Co(10 Å)/[Co(2.5 Å)/Pt(9 Å)]$_{12}$.

Referring now to FIG. 2, shown therein is a graph showing the variation of the interface exchange energy density J as a function of Ru spacer layer thickness of an anti-ferromagnetically coupled (AFC), superlattice-based perpendicular magnetic recording media according to the present invention, having a layer structure of [Co(2.5 Å)/Pt(9 Å)]$_4$/Co(10 Å)/Ru(variable Å)/Co(10 Å)/[Co(2.5 Å)/Pt(9 Å)]$_{12}$, wherein it is evident that the greatest amount of antiferromagnetic coupling between the spaced-apart pair of perpendicularly magnetically anisotropic multi-layer superlattices is achieved for Ru spacer layer thicknesses between about 3 and about 9 Å.

Figure 3:
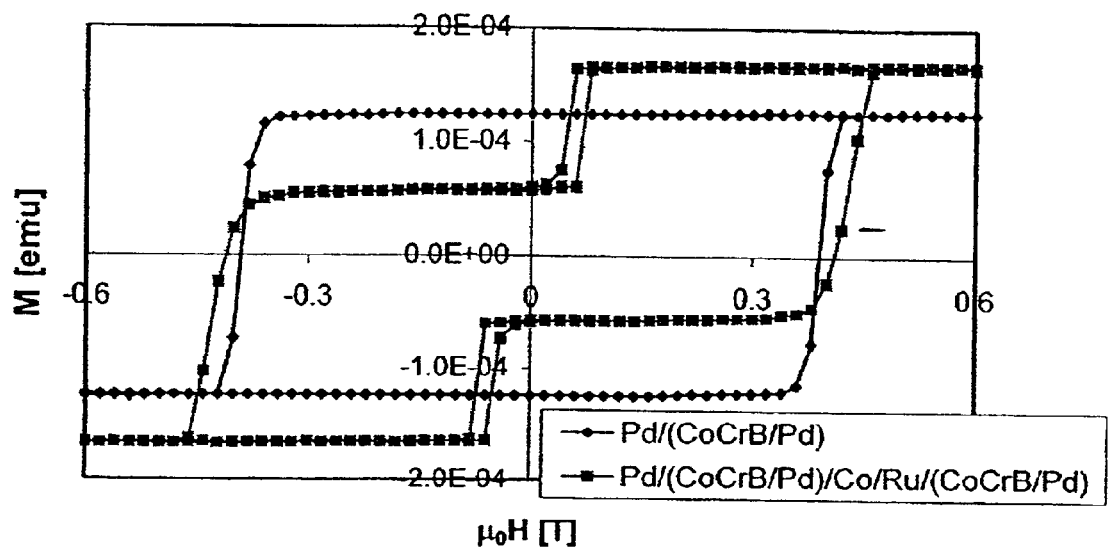
FIG. 3 shows M-H loops of a conventional single layer, superlattice-based perpendicular magnetic recording medium without a magnetically soft underlayer and a superlattice-based, AFC perpendicular magnetic recording medium without a magnetically soft underlayer, having respective layer structures of Pt(60 Å)/[CoCrB(2.5 Å)/Pt(9 Å)]$_{12}$ and Pt(60 Å)/[CoCrB(2.5 Å)/Pt(9 Å)]$_4$/Co(2 Å)/Ru(~5 Å)/[CoCrB(2.5 Å)/Pt(9 Å)]$_{12}$.

FIG. 3 shows M-H loops of a conventionally configured, single layer, superlattice-based perpendicular magnetic recording medium without a magnetically soft underlayer and a superlattice-based, AFC perpendicular magnetic recording medium without a magnetically soft underlayer, having respective layer structures of Pt(60 Å)/[CoCrB(2.5 Å)/Pt(9 Å)]$_{12}$ and Pt(60 Å)/[CoCrB(2.5 Å)/Pt(9 Å)]$_4$/Co(2 Å)/Ru(~5 Å)/[CoCrB(2.5 Å)/Pt(9 Å)]$_{12}$. In either instance, the medium was formed on a non-magnetic substrate with a nonmagnetic seed or underlayer thereon. As for the AFC medium, the main recording layer was constituted by the [CoCrB(2.5 Å)/Pt(9 Å)]$_{12}$ superlattice structure and the stabilization layer was constituted by the [CoCrB(2.5 Å)/Pt(9 Å)]$_4$ superlattice structure. The thin Co layer between the [CoCrB(2.5 Å)/Pt(9 Å)]$_4$ stabilzation layer and the Ru spacer layer serves as a thin interface layer for enhancing RKKY-type coupling of the main recording and stabilization layers across the Ru spacer layer. As is evident from FIG. 3, at zero externally applied magnetic field, the magnetic moments of the main recording and stabilization layers are anti-ferromagnetically aligned mainly as a result of the RKKY-type coupling therebetween. It follows that the total magnetic moment of the medium in the data storage state is reduced and equal to $(M_r t)_{total} = (M_r t)_{main\ layer} - (M_r t)_{stabilization\ layer}$, where $M_r$ and t are the remanent magnetization and thickness, respectively, of the layers. Therefore, by using AFC, a stable recording media design with low $(M_r t)_{total}$ can be obtained.

Figure 4:
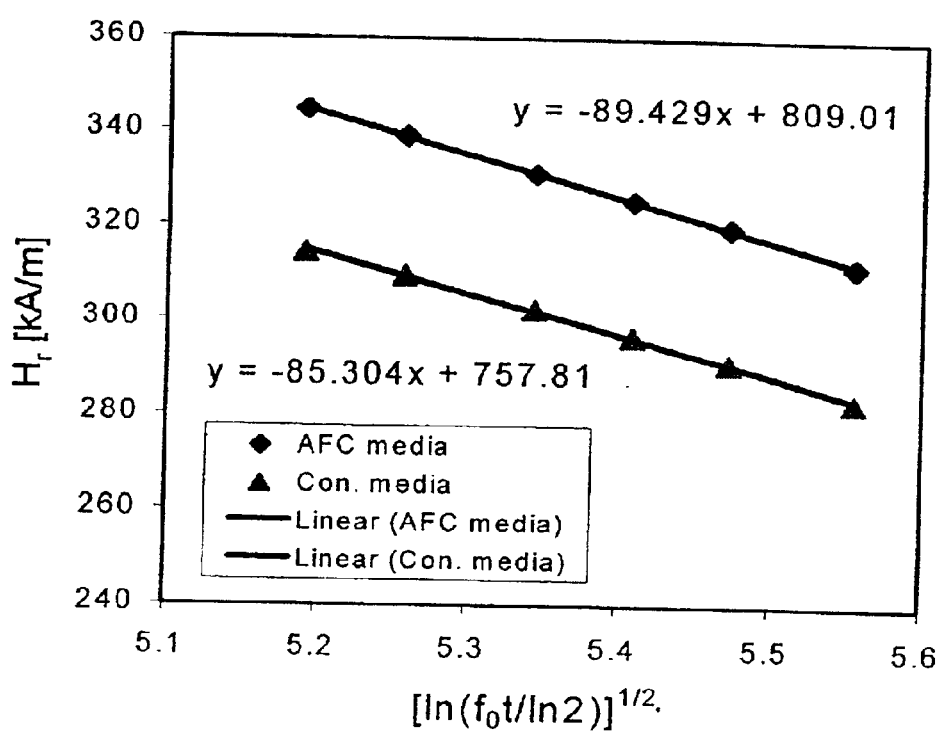
FIG. 4 shows dynamic coercivity measurements of AFC perpendicular and conventional magnetic recording media, i.e., the variation of remanent coercivity ($H_r$) as a function of the duration (t) of magnetic field application in VSM measurements.

Furthermore, such AFC media have improved stability arising from the anti-ferromagnetic coupling between the main recording and stabilization layers. Adverting to FIG. 4, shown therein is the variation of remanent coercivity ($H_r$) as a function of the duration (t) of magnetic field application in VSM measurements. The data are plotted therein using the following equation: $H_r(t) = H_A\{1 - [k_B T/(KV)_{eff} \ln(f_0 t/\ln 2)]^{1/2}\}$, where $H_A$ is the effective anisotropy field, T is the temperature, $k_B$ is the Boltzmann constant, and $f_0$ is the measurement frequency of ~3.5×10$^{10}$ Hz. The effective energy barrier $(KV)_{eff}$ was determined from a linear fit as 78.9 $k_B T$ for magnetic grains in the conventional media and 81.9 $k_B T$ for the magnetic grains in the main recording layer of the AFC media of the invention. The observed increase in the effective energy barrier for magnetic grains in the AFC media is due to the anti-ferromagnetic coupling between the main recording and stabilization layers. The above data demonstrate the efficacy of the inventive concept of anti-ferromagnetically coupling together a pair of vertically spaced-apart perpendicularly anisotropic-magnetic layers to effect anti-parallel alignment of their respective magnetic moments to obtain increased thermal stability and SMNR.

Figure 5:
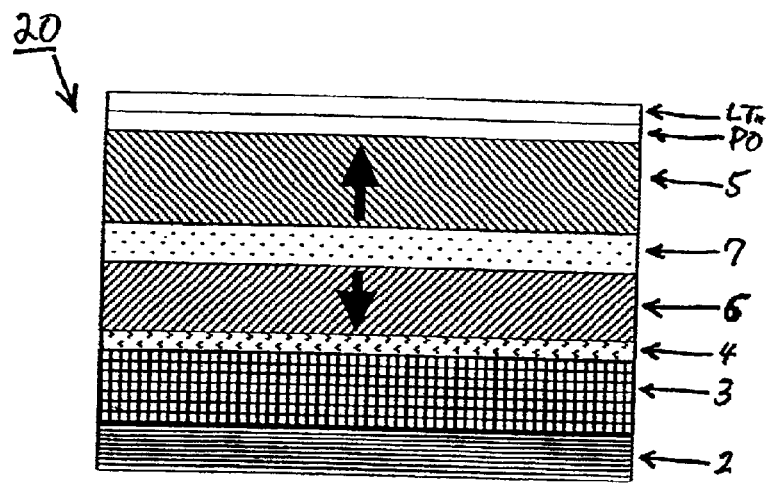
FIGS. 5–9 schematically illustrate, in simplified cross-sectional view, portions of embodiments of anti-ferromagnetically coupled (AFC) perpendicular magnetic recording media according to the present invention.

Adverting to FIGS. 5–9, schematically illustrated therein, in simplified cross-sectional view, are portions of several embodiments of anti-ferromagnetically coupled (AFC) perpendicular magnetic recording media according to the present invention. A first embodiment of a magnetic recording medium 20 according to the invention is shown in FIG. 5 and includes a nonmagnetic spacer layer for providing RKKY-type anti-ferromagnetic (AFC) coupling of a pair of vertically spaced apart, magnetically hard, perpendicular ferromagnetic layers, i.e., a lower, stabilization layer and an upper, main recording layer. More specifically, medium 20 comprises a non-magnetic substrate 2 for supporting the layer stack constituting the medium, which substrate 2 is formed of a non-magnetic material selected from the group consisting of: Al, NiP-plated Al, Al—Mg alloys, other Al-based alloys, other non-magnetic metals, other non-magnetic alloys, glass, ceramics, polymers, glass-ceramics, and composites and/or laminates thereof. The thickness of substrate 2 is not critical; however, in the case of magnetic recording media for use in hard disk applications, substrate 2 must be of a thickness sufficient to provide the necessary rigidity.

Overlying and in contact with the upper surface of substrate 2 is a soft magnetic underlayer 3 comprised of an about 500 to about 4,000 Å thick layer, comprised of at least one soft ferromagnetic material selected from Ni, NiFe (Permalloy), Co, CoZr, CoZrCr, CoZrNb, CoTaZr, CoFe, Fe, FeN, FeSiAl, FeSiAlN, FeTaC, FeAlN, FeTaN, CoFeZr, FeCoB, and FeCoC. By way of illustration only, soft magnetic underlayer 3 may comprise an about 2,000 Å thick layer of FeCoB. Alternatively, soft magnetic underlayer 3 may comprise a plurality of layers of soft magnetic material separated by At least one thin, nonmagnetic interlayer 4 is formed in overlying contact with the upper surface of the soft magnetic underlayer 3, and comprises an about 10 to about 300 Å thick layer or layers of at least one non-magnetic material selected from Pt, Pd, Ir, Re, Ru, Hf, alloys thereof, or a hexagonal Co-based non-magnetic alloy with at least one of Cr, Pt, Ta, and B.

Figure 1:
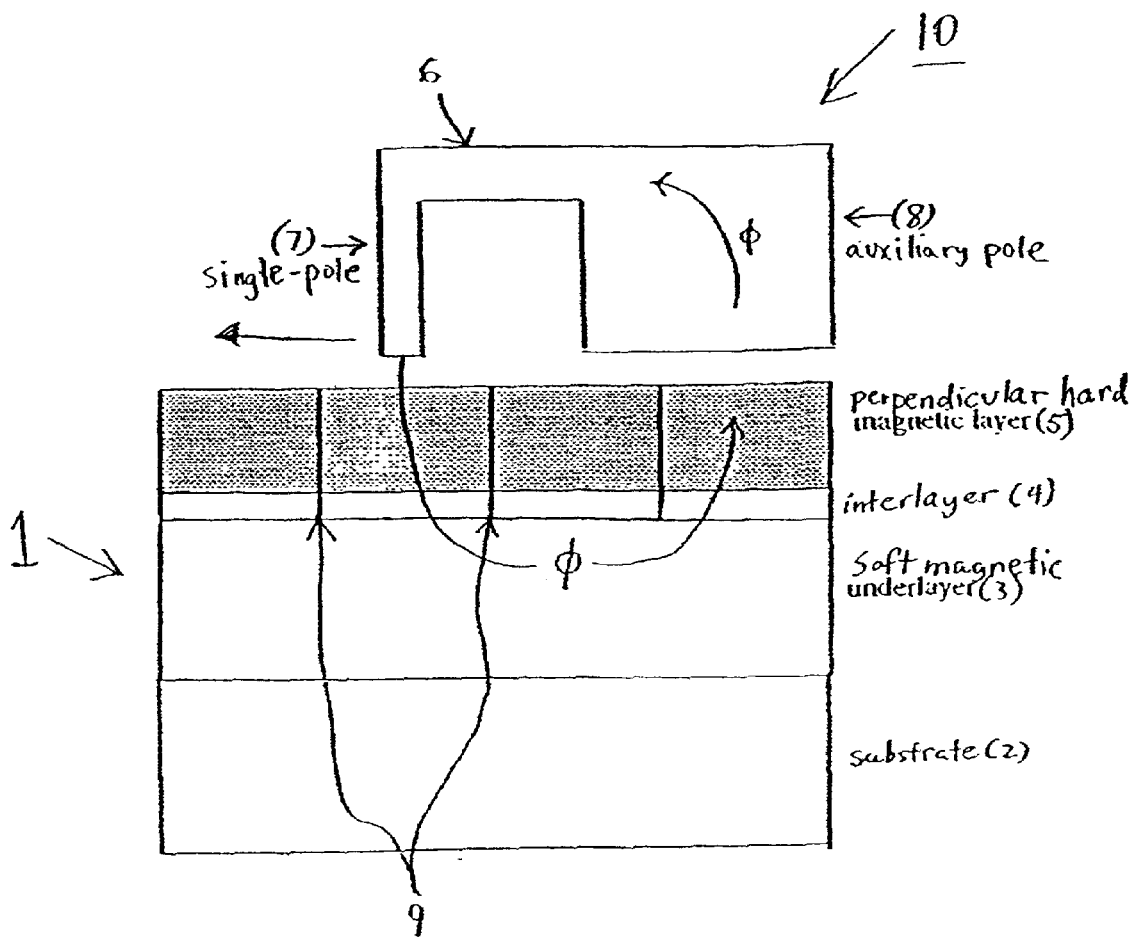
FIG. 1 schematically illustrates, in simplified, cross-sectional view, a portion of a magnetic recording, storage, and retrieval system comprised of a conventional perpendicular-type magnetic recording medium including a soft magnetic underlayer and a single-pole transducer head.

According to the invention, the single magnetically hard, perpendicular ferromagnetic recording layer 5 of the conventionally configured perpendicular magnetic recording medium 1 illustrated in FIG. 1 is replaced with a sandwich-type structure comprised of a pair of strongly anti-ferromagnetically coupled (AFC), magnetically hard, perpendicular ferromagnetic layers spaced apart by means of a coupling structure. More specifically the sandwich-type AFC structure comprises a first, or lower magnetically hard, perpendicular ferromagnetic layer 6, termed a "stabilization layer" and a second, or upper magnetically hard, perpendicular ferromagnetic layer 5, termed a "main recording layer", which pair of layers are spaced apart by a coupling structure including at least a thin, nonmagnetic spacer layer 7 comprised of a non-magnetic material selected to provide a large RKKY-type anti-ferromagnetic coupling (AFC) effect.

By way of illustration, but not limitation, each of the first, or lower, and second, or upper, magnetically hard, perpendicular ferromagnetic layers respectively constituting the stabilization layer 6 and main recording layer 5 may comprise an about 3 to about 300 Å thick layer of a ferromagnetic alloy selected from CoCr and CoCr containing at least one element selected from Pt, Ta, B, Mo, Ru, Si, Ge, Nb, Fe, Ni, and W, or the stabilization layer 6 and main recording layer 5 may comprise an about 10 to about 300 Å thick layer of a (CoX/Pd or Pt)$_n$, (FeX/Pd or Pt)$_n$, or (FeCoX/Pd or Pt)$_n$ multilayer magnetic superlattice structure, where n is an integer from about 1 to about 25, each of the alternating layers of Co-based, Fe-based, or CoFe-based magnetic alloy is from about 1.5 to about 10 Å thick, X is at least one element selected from the group consisting of Pt, Ta, B, Mo, Ru, Si, Ge, Nb, Ni, Cr, and W, and each of the alternating layers of non-magnetic Pd or Pt is from about 3 to about 15 Å thick; and the coupling structure including at least thin, non-magnetic spacer layer 7 providing a large amount of anti-ferromagnetic coupling between the stabilization and main recording layers may comprise an about 2 to about 15 Å thick, e.g., an about 4 to about 11 Å thick, layer of a non-magnetic material selected from the group consisting of Ru, Rh, Ir, Cr, Cu, Re, V, and their alloys.

Medium 20 may further comprise protective overcoat PO and lubricant topcoat LT layers sequentially formed in conventional fashion, as by sputtering and dipping, respectively, over the upper surface of the second, or upper, ferromagnetic layer 6, which layers are present but not shown in the embodiments of FIGS. 6–9 in order not to unnecessarily obscure the key features of the invention.

Figure 6:
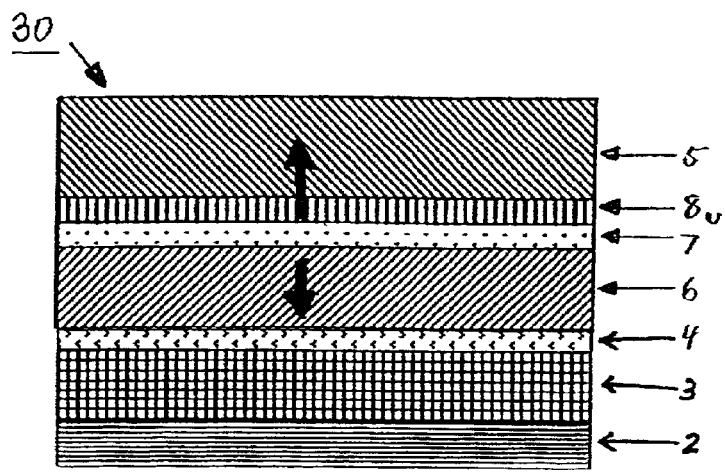
Figure 7:
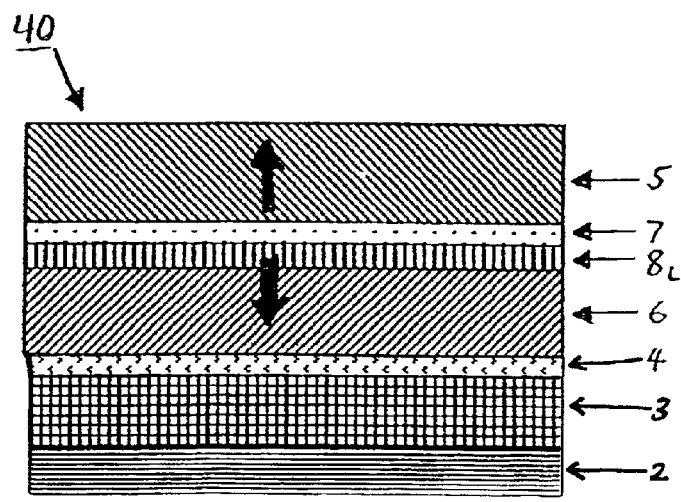
Figure 8:
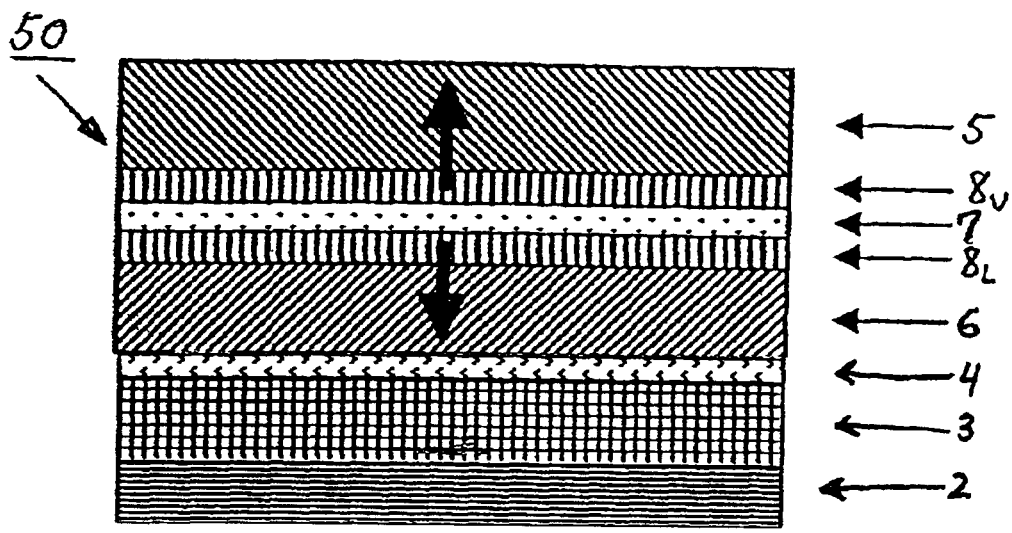

FIGS. 6–8, respectively, illustrate embodiments of the present invention wherein the coupling structure consists essentially of the aforementioned nonmagnetic spacer layer 7 interposed between vertically spaced-apart stabilization and main recording layers 6 and 5, respectively, and at least one ferromagnetic interface layer 8 at at least one interface between the non-magnetic spacer layer 7 and the upper, main recording layer 5 and/or the lower, stabilization layer 6 for further increasing RKKY-type coupling between the lower and upper perpendicular ferromagnetic layers 6 and 5, respectively.

More specifically, FIG. 6 illustrates an embodiment of an AFC perpendicular magnetic recording medium 30 according to the invention, wherein a ferromagnetic interface layer $8_U$ is present at the interface between the non-magnetic spacer layer 7 and the upper, main recording layer 5; FIG. 7 illustrates an embodiment of a magnetic recording medium 40 according to the invention, wherein a ferromagnetic interface layer $8_L$ is present at the interface between the non-magnetic spacer layer 7 and the lower, stabilization layer 5; and FIG. 8 illustrates an embodiment of a magnetic recording medium 50 according to the invention, wherein a ferromagnetic interface layer $8_U$, $8_L$ is present at each of the interfaces between the non-magnetic spacer layer 7 and the upper, main recording layer 5 and the lower, stabilization layer 5.

According to the invention, each of the ferromagnetic interface layers 8, $8_U$, and $8_L$ of media 30, 40, and 50 comprises an about 1 monolayer to an about 40 Å thick layer of a ferromagnetic material having a saturation magnetization value $M_s$>300 emu/cc. Each of the ferromagnetic interface layers 8, $8_U$, and $8_L$ may comprise a high moment element or alloy selected from Fe, Co, FeCo, and their alloys containing at least one element selected from Cr, Pt, Ta, B, Mo, Ru, Si, Ge, Nb, Ni, Cu, Ag, Au, and W, wherein the concentration of Co, Fe, or CoFe in the alloy is constant or varies across the thickness of the at least one interface layer 8, $8_U$, and $8_L$ from higher near an interface with the non-magnetic spacer layer 7 to lower near an interface with the lower, stabilization layer 6 or the upper, main recording layer 5.

The present invention also contemplates formation of magnetic recording media comprising at least one additional stacked pair of layers between the main recording layer 5 and the non-magnetic spacer layer 7. Each additional stacked pair of layers comprises a magnetic layer with perpendicular magnetic anisotropy and a non-magnetic spacer layer, such that magnetic layers and non-magnetic spacer layers alternate across the thickness of the layer stack. The magnetic energy of the magnetic layers and the coupling energy between adjacent magnetic layers (primarily RKKY-type coupling and dipole-dipole interactions) are adjusted to provide anti-parallel alignments of the magnetic moments of adjacent magnetic layers in the data storage state of the media.

Figure 9:
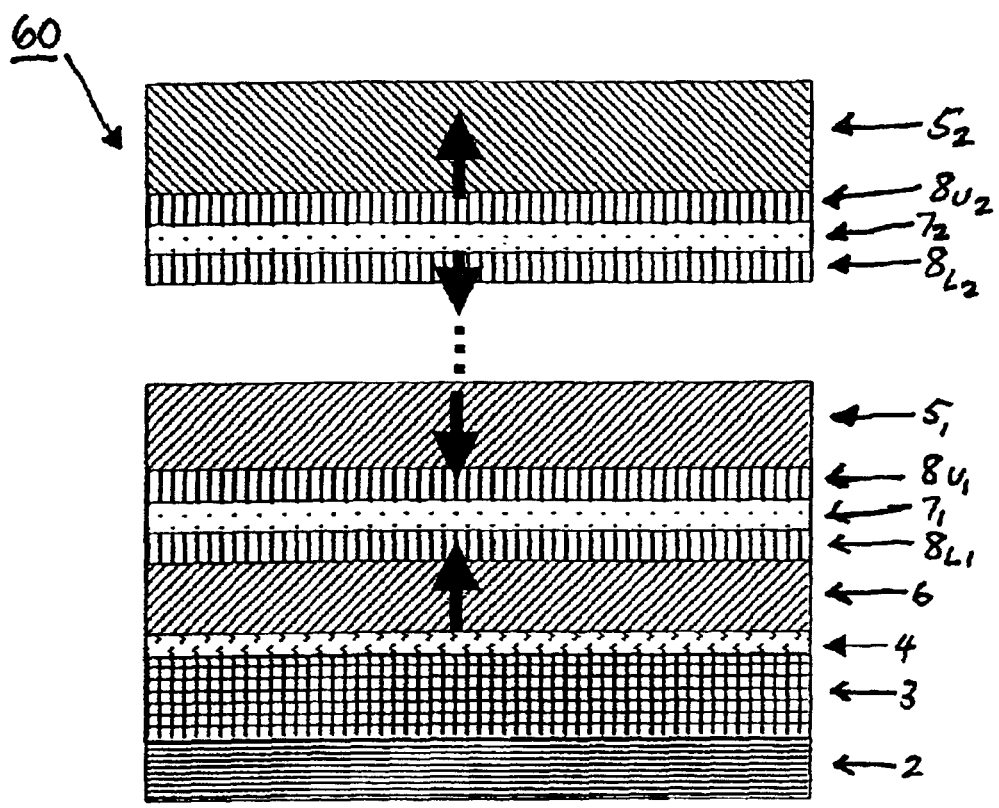

FIG. 9 illustrates a magnetic medium 60 comprising 2 stacked pairs of magnetically coupled perpendicular ferromagnetic layers $5_1$, $5_2$ and respective thin non-magnetic spacer layers $7_1$, $7_2$, along with respective lower thin ferromagnetic interface layers $8_{L1}$, $8_{L2}$ and upper thin ferromagnetic interface layers $8_{U1}$, $8_{U2}$. Medium 60 further includes one perpendicularly magnetically anisotropic stabilization layer 6.

Advantageously, each of the illustrated thin film layers of the media of the present invention, including those of the magnetic coupling structure, may be deposited or otherwise formed by conventional physical vapor deposition (PVD) techniques (not described herein for brevity), e.g., sputtering, or by a combination of PVD techniques selected from sputtering, vacuum evaporation, etc.

The present invention thus advantageously provides high quality, thermally stable, high areal recording density perpendicular magnetic recording media, which media achieve improved thermal stability and SMNR via magnetic coupling of a magnetically hard, perpendicular main ferromagnetic recording layer with another magnetically hard perpendicular ferromagnetic layer, i.e., a stabilization layer. Moreover, the inventive methodology can be practiced in a cost-effective manner utilizing conventional manufacturing technology and equipment (e.g., sputtering technology/equipment) for automated, large-scale manufacture of magnetic recording media, such as hard disks. Finally, the invention is not limited to use with hard disks but rather is broadly applicable to the formation of thermally stable, high areal density perpendicular magnetic recording media suitable for use in all manner of devices, products, and applications.

In the previous description, numerous specific details are set forth, such as specific materials, structures, processes, etc., in order to provide a better understanding of the present invention. However, the present invention can be practiced without resorting to the details specifically set forth herein. In other instances, well-known processing techniques and structures have not been described in order not to unnecessarily obscure the present invention.

Only the preferred embodiments of the present invention and but a few examples of its versatility are shown and described in the present disclosure. It is to be understood that the present invention is capable of use in various other combinations and environments and is susceptible of changes and/or modifications within the scope of the inventive concept as expressed herein.

What is claimed is:

1. A high areal recording density, anti-ferromagnetically coupled ("AFC") perpendicular magnetic recording medium, comprising:
   (a) a non-magnetic substrate having a surface; and
   (b) a layer stack formed over said substrate surface, said layer stack comprising, in overlying sequence from said substrate surface:
      an underlayer comprised of a magnetically soft ferromagnetic material or a plurality of layers of magnetically soft ferromagnetic material separated by thin non-magnetic spacer layers;
      at least one non-magnetic interlayer;
      a perpendicularly anisotropic stabilization layer comprised of a hard ferromagnetic material;
      a non-magnetic spacer layer; and
      a perpendicularly anisotropic main recording layer comprised of a hard ferromagnetic material;
   wherein said perpendicularly anisotropic stabilization layer and said perpendicularly anisotropic main recording layer are anti-ferromagnetically coupled and each compromise:
      a layer of a $(CoX/Pd$ or $Pt)_n$, $(FeX/Pd$ or $Pt)_n$, or $(FeCoX/Pd$ or $Pt)_n$ multilayer magnetic superlattice structure, where n is an integer from about 1 to about 25 and X is at least one element selected from the group consisting of Pt, Ta, B, Mo, Ru, Si, Ge, Nb, Ni, Cr, and W.

2. The perpendicular magnetic recording medium as in claim 1, wherein:
   said non-magnetic spacer layer is from about 2 to about 15 Å thick, selected to maximize anti-ferromagnetic coupling between stabilization layer and main recording layer, and comprises a material selected from the group consisting of Ru, Rh, Ir, Cr, Cu, Re, V, and their alloys; and said layer stack (b) optionally further comprises:

at least one ferromagnetic interface layer at at least one interface between said non-magnetic spacer layer and said main recording layer and said stabilization layer.

3. The perpendicular magnetic recording medium as in claim 2, wherein:

said at least one ferromagnetic interface layer is present at the interface between said non-magnetic spacer layer and said main recording layer.

4. The perpendicular magnetic recording medium as in claim 2, wherein:

said at least one ferromagnetic interface layer is present at the interface between said non-magnetic spacer layer and said stabilization layer.

5. The perpendicular magnetic recording medium as in claim 2, wherein:

said at least one ferromagnetic interface layer is present at the interfaces between said non-magnetic spacer layer and each of said main recording layer and said stabilization layer.

6. The perpendicular magnetic recording medium as in claim 2, wherein:

said at least one ferromagnetic interface layer comprises an about 1 monolayer to an about 40 Å thick layer of a ferromagnetic material having a saturation magnetization value $M_S$>300 emu/cc.

7. The perpendicular magnetic recording medium as in claim 6, wherein:

said at least one ferromagnetic interface layer comprises a layer of a high moment element or alloy selected from Fe, Co, FeCo, and their alloys containing at least one element selected from Cr, Pt, Ta, B, Mo, Ru, Si, Ge, Nb, Ni, Cu, Ag, Au, and W, wherein the concentration of Co, Fe, or CoFe in the alloy is constant or varies across the thickness of said at least one interface layer from higher near an interface with said non-magnetic spacer layer to lower near an interface with said stabilization layer or said main recording layer.

8. The perpendicular magnetic recording medium as in claim 1, wherein:

said layer stack further includes at least one additional stacked pair of layers between said main recording layer and said non-magnetic spacer layer, comprising a perpendicularly anisotropic magnetic layer and a non-magnetic spacer layer, such that said layer stack comprises alternating magnetic layers and non-magnetic spacer layers, and magnetic energies of said magnetic layers and coupling energies between said magnetic layers are selected to provide anti-parallel alignment of magnetic moments of adjacent magnetic layers during data storage in said medium.

9. The perpendicular magnetic recording medium as in claim 8, further comprising:

at least one ferromagnetic interface layer at at least one interface between said non-magnetic spacer layers and said main recording layers and said stabilization layer.

10. The perpendicular magnetic recording medium as in claim 1, wherein:

said non-magnetic substrate comprises a material selected from the group consisting of: Al, NiP-plated Al, Al-Mg alloys, other Al-based alloys, other non-magnetic metals, other non-magnetic alloys, glass, ceramics, polymers, glass-ceramics, and composites and/or laminates thereof;

said underlayer comprises an about 500 to about 4,000 Å thick layer comprised of at least one soft ferromagnetic material selected from Ni, NiFe (Permalloy), Co, CoZr, CoZrCr, CoZrNb, CoTaZr, CoFe, Fe, FeN, FeSiAl, FeSiAlN, FeTaC, FeAlN, FeTaN, CoFeZr, FeCoB, and FeCoC; and said at least one interlayer comprises an about 10 to about 300 Å thick layer or layers of at least one non-magnetic material selected from Pt, Pd, Ir, Re, Ru, Hf, alloys thereof, or a hexagonal Co-based non-magnetic alloy with at least one of Cr, Pt, Ta, and B.

11. The perpendicular magnetic recording medium as in claim 1, further comprising:

(c) a protective overcoat layer on said main recording layer; and (d) a lubricant topcoat layer over said protective overcoat layer.

12. The perpendicular magnetic recording medium as in claim 1, wherein: each of the alternating layers of Co-based, Fe-based, or CoFe-based magnetic alloy is from about 1.5 to about 10 Å thick and each of the alternating layers of non-magnetic Pd or Pt is from about 3 to about 15 Å thick.

13. A high areal recording density, anti-ferromagnetically coupled ("AFC") perpendicular magnetic recording medium, comprising:

(a) a non-magnetic substrate having a surface; and (b) a layer stack formed over said substrate surface, said layer stack comprising, in overlying sequence from said substrate surface:

an underlayer comprised of a magnetically soft ferromagnetic material or a plurality of layers of magnetically soft ferromagnetic material separated by thin non-magnetic spacer layers;

at least one non-magnetic interlayer;

a perpendicularly anisotropic stabilization layer comprised of a hard ferromagnetic material;

a non-magnetic spacer layer; and a perpendicularly anisotropic main recording layer comprised of a hard ferromagnetic material;

wherein said perpendicularly anisotropic stabilization layer and said perpendicularly anisotropic main recording layer are anti-ferromagnetically coupled (AFC) across said non-magnetic spacer layer to orient magnetic moments thereof anti-parallel and thereby provide said medium with increased SMNR and thermal stability, said stabilization layer and said main recording layer each comprise an about 10 to about 300 Å thick layer of a (CoX/Pd or Pt)$_n$, (FeX/Pd or Pt)$_n$, or (FeCoX/Pd or Pt)$_n$ multilayer magnetic superlattice structure, where n is an integer from about 1 to about 25, each of the alternating layers of Co-based, Fe-based, or CoFe-based magnetic alloy is from about 1.5 to about 10 Å thick, X is at least one element selected from the group consisting of Pt, Ta, B, Mo, Ru, Si, Ge, Nb, Ni, Cr, and W, and each of the alternating layers of non-magnetic Pd or Pt is from about 3 to about 15 Å thick.

14. A method of manufacturing a high areal recording density, anti-ferromagnetically coupled ("AFC") perpendicular magnetic recording medium, comprising the steps of:

(a) providing a non-magnetic substrate having a surface; and (b) forming a layer stack over said substrate surface, comprising the following sequential steps for forming an overlying sequence of layers from said substrate surface:

(b$_1$) forming an underlayer comprised of a magnetically soft ferromagnetic material or a plurality of layers of magnetically soft material separated by thin non-magnetic spacer layers;

(b$_2$) forming at least one non-magnetic interlayer;

(b$_3$) forming a perpendicularly anisotropic stabilization layer comprised of a hard ferromagnetic material;

(b$_4$) forming a non-magnetic spacer layer, and (b$_5$) forming a perpendicularly anisotropic main recording layer comprised of a hard ferromagnetic material;

wherein said perpendicularly anisotropic stabilization layer and said perpendicularly anisotropic main recording layer are antiferromagnetically coupled and each comprise:

a layer of a (CoX/Pd or Pt)$_n$, (FeX/Pd or Pt)$_n$, or (FeCoX/Pd or Pt)$_n$ multilayer magnetic superlattice structure, where n is an integer from about 1 to about 25 and X is at least one element selected from the group consisting of Pt, Ta, B, Mo, Ru, Si, Ge, Nb, Ni, Cr, and W.

15. The method according to claim 14, wherein:

step (b$_4$) comprises forming an about 2 to about 15 Å thick layer of a non-magnetic material selected to maximize anti-ferromagnetic coupling between stabilization layer and main recording layer, chosen from the group consisting of Ru, Rh, Ir, Cr, Cu, Re, V, and their alloys; and said method optionally further comprises the step of:

(b6) forming at least one ferromagnetic interface layer at at least one interface between said non-magnetic spacer layer and said main recording layer and said stabilization layer, wherein step (b$_6$) comprises one of the following alternatives:

(i) forming said at least one ferromagnetic interface layer at an interface between said non-magnetic spacer layer and said main recording layer;

(ii) forming said at least one ferromagnetic interface layer at an interface between said non-magnetic spacer layer and said stabilization layer; and (iii) forming said at least one ferromagnetic interface layer at interfaces between said non-magnetic spacer layer and each of said main recording layer and said stabilization layer.

16. The method according to claim 15, wherein step (b$_6$) comprises forming an about 1 monolayer to an about 40 Å thick layer of a ferromagnetic material having a saturation magnetization value M$_S$>300 emu/cc, comprising a high moment element or alloy selected from Fe, Ca, FeCo, and their alloys containing at least one element selected from Cr, Pt, Ta, B, Mo, Ru, Si, Ge, Nb, Ni, Cu, Ag, Au, and W, wherein the concentration of Ca, Fe, or CoFe in the alloy is constant or varies across the thickness of said at least one interface layer from higher near an interface with said non-magnetic spacer layer to lower near an interface with said stabilization layer or said main recording layer.

17. The method according to claim 14, wherein step (b) further comprises the sequential steps of:

(b$_6$) forming a non-magnetic spacer layer in overlying contact with the main recording layer formed in step (b$_5$); and (b$_7$) forming a perpendicularly anisotropic main recording layer in overlying contact with the non-magnetic spacer layer formed in step (b$_6$);

wherein the sequence of performing step (b$_6$) followed by step (b$_7$) is performed one or more times and step (b) comprises a still further step (b$_8$) of forming at least one ferromagnetic interface layer at at least one interface between said non-magnetic spacer layers and said main recording layers and said stabilization layer.

18. The method according to claim 14, wherein:

steps (b$_3$) and (b$_5$) for forming said stabilization and main recording layers each comprise forming a perpendicularly anisotropic, hard ferromagnetic layer selected from an about 10 to about 300 Å thick layer of a (CoX/Pd or Pt)$_n$, (FeX/Pd or Pt)$_n$, or (FeCoX/Pd or Pt)$_n$ multilayer magnetic superlattice structure, where n is an integer from about 1 to about 25, each of the alternating layers of Co-based, Fe-based, or CoFe-based magnetic alloy is from about 1.5 to about 10 Å thick, X is at least one element selected from the group consisting of Pt, Ta, B, Mo, Ru, Si, Ge, Nb, Ni, Cr, and W, and each of the alternating layers of non-magnetic Pd or Pt is from about 3 to about 15 Å thick.

19. The method according to claim 14, wherein:

step (a) comprises providing a non-magnetic substrate comprising a material selected from the group consisting of: Al, NiP-plated Al, Al-Mg alloys, other Al-based alloys, other non-magnetic metals, other non-magnetic alloys, glass, ceramics, polymers, glass-ceramics, and composites and/or laminates thereof;

step (b$_1$) comprises forming an underlayer comprising an about 500 to about 4,000 Å thick layer comprised of at least one soft ferromagnetic material selected from Ni, NiFe (Permalloy), Co, CoZr, CoZrCr, CoZrNb, CoTaZr, CoFe, Fe, FeN, FeSiAl, FeSiAlN, FeTaC, FeAlN, FeTaN, CoFeZr, FeCoB, and FeCoC;

step (b$_2$) comprises forming at least one interlayer comprising an about 10 to about 300 Å thick layer or layers of at least one non-magnetic material selected from Pt, Pd, Ir, Re, Ru, Hf, alloys thereof, or a hexagonal Co-based non-magnetic alloy with at least one of Cr, Pt, Ta, and B; and said method comprises the further steps of:

(c) forming a protective overcoat layer on said main recording layer; and (d) forming a lubricant topcoat layer over said protective overcoat layer.

20. The perpendicular magnetic recording medium as in claim 14, wherein: each of the alternating layers of Co-based, Fe-based, or CoFe-based magnetic alloy is from about 1.5 to about 10 Å thick and each of the alternating layers of non-magnetic Pd or Pt is from about 3 to about 15 Å thick.

* * * * *